United States Patent [19]

Kim

[11] Patent Number: 5,051,674
[45] Date of Patent: Sep. 24, 1991

[54] APPARATUS FOR PREVENTING AN OVERRUN OF A SPINDLE MOTOR

[75] Inventor: Young-Han Kim, Suweon, Rep. of Korea

[73] Assignee: SamSung Electronics Co., Ltd., Suwon, Rep. of Korea

[21] Appl. No.: 518,574

[22] Filed: May 3, 1990

[30] Foreign Application Priority Data

Oct. 13, 1989 [KR] Rep. of Korea ............... 89-14668

[51] Int. Cl.$^5$ .......................................... G11B 19/24
[52] U.S. Cl. ................................. 318/561; 318/594; 318/560; 360/73.03; 358/335; 358/337
[58] Field of Search ............... 318/560–640; 360/72–79, 73.3, 73.8, 10.2, 77.03; 358/335, 337, 338

[56] References Cited

U.S. PATENT DOCUMENTS

| | | |
|---|---|---|
| 3,893,169 | 7/1975 | Hall, Jr. ............... 360/73.03 X |
| 4,423,440 | 12/1983 | Tachi ..................... 358/335 |
| 4,555,734 | 11/1985 | Fukui ..................... 358/337 X |
| 4,614,981 | 9/1986 | Fukui ..................... 358/337 |
| 4,623,939 | 11/1986 | Machida et al. ............ 360/73.03 X |
| 4,675,855 | 6/1987 | Iso et al. ................. 360/73.03 X |
| 4,748,608 | 5/1988 | Matsumoto et al. ......... 360/73.03 X |
| 4,763,205 | 8/1988 | Okano .................... 358/337 |
| 4,815,063 | 3/1989 | Aoshima et al. ........... 360/73.03 X |
| 4,823,203 | 4/1989 | Narusawa ................. 360/73.03 X |
| 4,835,632 | 5/1989 | Shih et al. ................ 318/594 X |
| 4,835,753 | 5/1989 | Yasuda ................... 318/599 X |
| 4,855,847 | 8/1989 | Kanamaru ................ 360/73.03 X |
| 4,855,978 | 8/1989 | Kanamaru ................ 360/73.03 X |
| 4,885,644 | 12/1989 | Ishii et al. ................ 360/73.03 X |
| 4,908,810 | 3/1990 | Oie ....................... 360/73.03 |
| 4,933,774 | 6/1990 | Ishimaru .................. 358/335 |
| 4,947,264 | 8/1990 | Narusawa ................ 358/337 |

Primary Examiner—Paul Ip
Attorney, Agent, or Firm—Robert E. Bushnell

[57] ABSTRACT

A spindle motor controlling apparatus having a motor driving device, a motor speed controlling device, a MICOM and an image processing device uses a horizontal synchronization comparing device which detects a horizontal synchronization signal of the image processing device and compares the detected synchronization signal with a reference synchronization signal and applies the compared signal to the MICOM. The motor driving device further includes a switching part for providing power according to the control signal of the MICOM to the spindle motor.

2 Claims, 2 Drawing Sheets

APPARATUS FOR PREVENTING AN OVERRUN OF A SPINDLE MOTOR

BACKGROUND OF THE INVENTION

The present invention relates to a spindle motor, particularly to an apparatus for preventing an overrun of the spindle motor due to a defective speed control apparatus.

The spindle motor needs to be rotated at constant speed in video disk players, consequently a frequency generator has been used in order to control the speed of the spindle motor. FIG. 1 shows a block diagram of a conventional speed control apparatus of a spindle motor. In a motor driving means 100 for driving the spindle motor 1, a power supply 12 is connected to the spindle motor 1 to provide electric power for a rotation of the spindle motor 1. A disk 2 is placed at the top of a rotary axis 4 of the spindle motor in order to be rotated according to the rotation of the spindle motor 1.

White and black stripes (not shown) are formed in said spindle motor axis 4, so that the motor speed controlling means 200 can detect the frequency signal effected by the change of the white and black stripes as the motor rotates.

A motor speed controlling means 200 controls a rotating speed of said spindle motor 1, in which a frequency sensor 3 detecting a frequency signal according to a rotation of the spindle motor axis 4, and a reference frequency synchronization generator 6 changing to provide a reference frequency according to a control signal microcomputer MICOM 7 are connected to a time-base controller 5 providing a control signal by comparing the applied frequency signals. Said time-base controller 5 is connected to a spindle servo 8 which controls the rotating speed of said spindle motor 1 according to an applied control signal.

An image processing device 300 which picks up the data signal of the disk 2 and provides it as an image signal consists of a light pickup 9 to read the recorded data from the disk 2, a preamplifier 10 to amplify the signal applied from the light pickup 9, and a video signal processor 11 to change the amplified data signal to the image signal.

In the conventional speed control apparatus, when the spindle motor 1 is driven by the power supply 12, the frequency sensor 3 detects the frequency signal generated by the white and black stripes on the axle 4 of the spindle motor 1 and provides it to the time-base controller 5.

Simultaneously, the reference frequency generator 6 provides a reference frequency signal to the time-base controller 5. According the control signal of the MICOM 7, the time-base controller 5 compares the detected frequency signal with the reference frequency signal and provides a control signal based on the compared result to the spindle servo 8. The spindle servo 8 controls the speed of the spindle motor 1 according to the control signal provided by the time-base controller 5. The light pickup 9 reads the data from the disk 2 and applies it to the preamplifier 10, so that an read data is amplified and is changed to the image signal by the video processor 11.

However, in the conventional speed control apparatus described above, if the frequency sensor 3 is defective, the detected frequency signal, which is compared with the reference frequency signal, is no longer applied to a time-base controller 5. Thus, a control signal to increase the speed of the spindle motor 1 is continuously applied to the spindle servo 8, thereby continuously increasing more and more the speed of the spindle motor 1. In the worst case, the video disk player can be broken.

SUMMARY OF THE INVENTION

It is an object of the present invention to provide a spindle motor controlling apparatus which can stop the driving of the motor according before it overruns due to a defective frequency sensor by comparing the horizontal synchronization signal detected in the image signal processing devices with a reference horizontal synchronization signal.

According to the present invention, there is provided a spindle motor controlling apparatus having a motor driving device for driving a spindle motor, a motor speed controlling device for controlling the rotating speed of from said spindle motor, a MICOM for applying a control signal to said motor speed controlling device, and an image processing means for providing an image signal by picking up a data signal of a disk mounted on said spindle motor, comprising: a horizontal synchronization comparing device for detecting a horizontal synchronization signal of said image processing device and for comparing the detected synchronization signal with a reference synchronization signal and for applying the compared signal to said MICOM; said motor driving device further including a switching device placed between the spindle motor and the power supply, for providing power according to the control signal of a MICOM to said spindle motor.

BRIEF DESCRIPTION OF THE DRAWINGS

These and other objects, features, and advantages of the present invention will become more apparent from the following description for the preferred embodiments taken in conjunction with the accompanying drawings, in which.

DETAILED DESCRIPTION OF THE INVENTION

The present invention will be now described in more detail with reference to the accompanying drawings.

Figure 1:
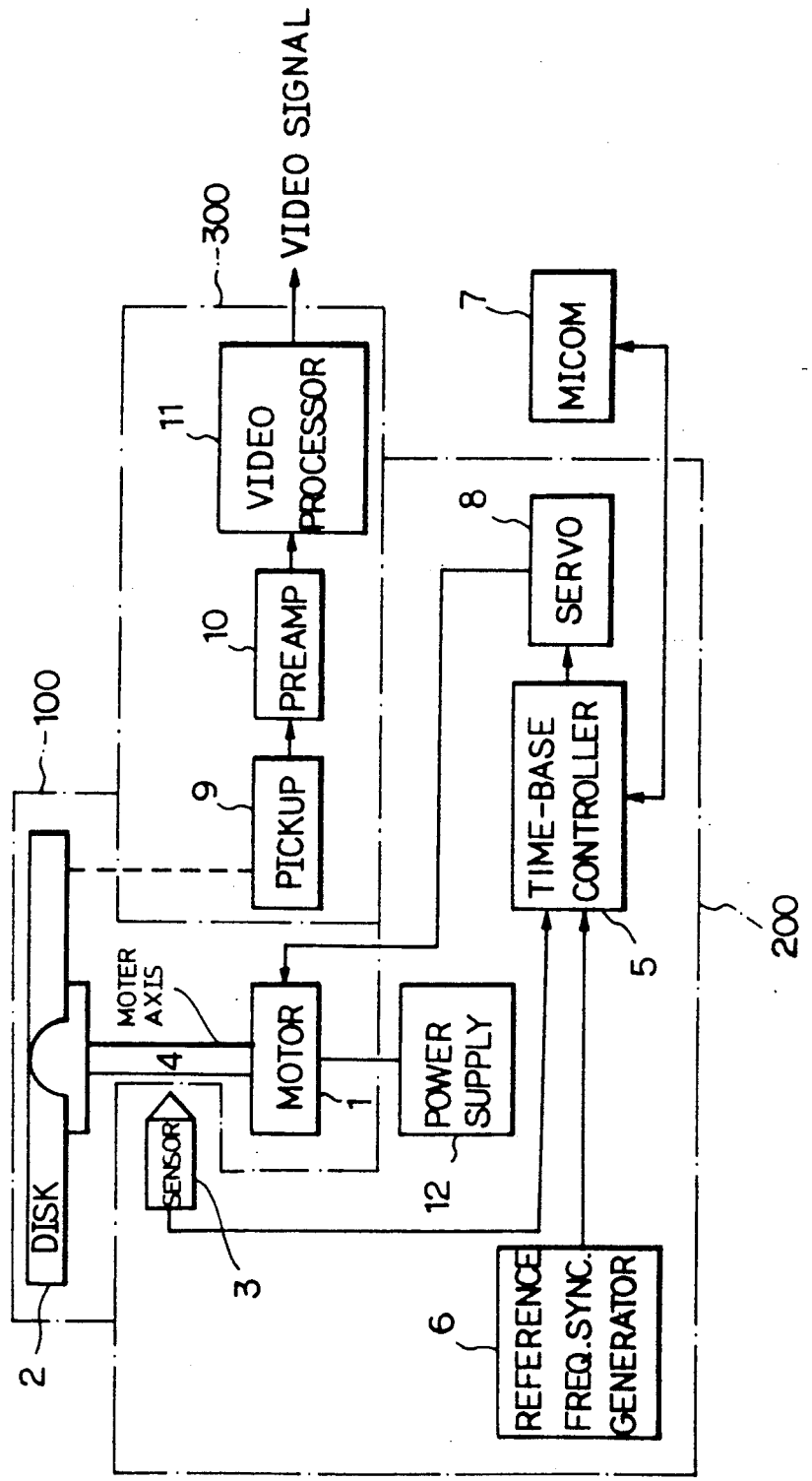
FIG. 1 is a block diagram of a conventional speed controlling apparatus of a spindle motor.
Figure 2:
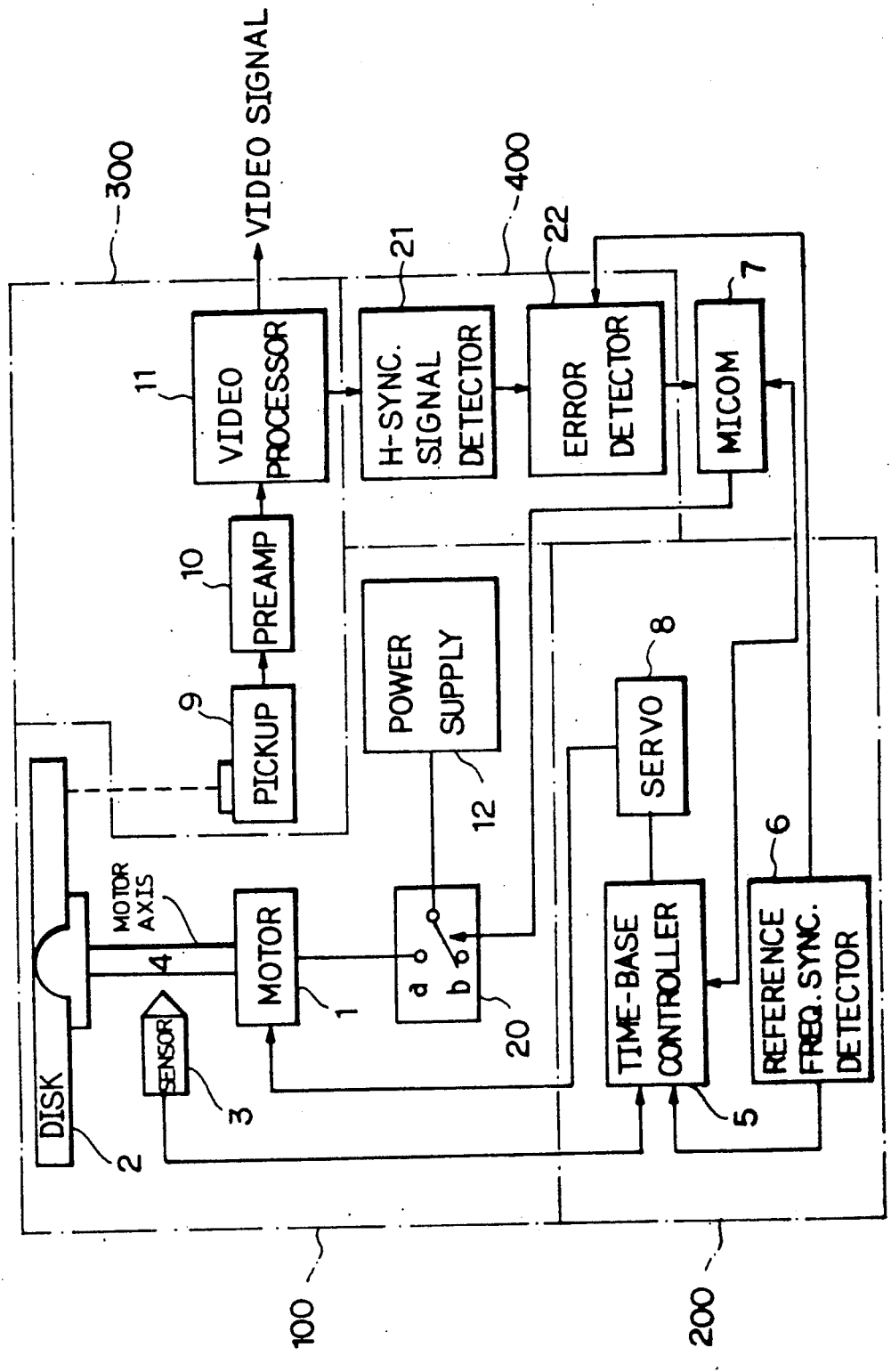
FIG. 2 is a block diagram of a apparatus for preventing the overrun of the spindle motor.

FIG. 2 shows a block diagram of the spindle motor controlling apparatus according to the present invention.

A motor speed controlling device 200 and an image processing device 300 are the same as those in the conventional controlling apparatus.

A motor driving device 100 includes a switching device 20 to control the connection between the spindle motor 1 and a power supply 12 according to a control signal of a MICOM 7.

A horizontal synchronization comparing device 400, which is placed between the image processing device 300 and the MICOM 7, includes a horizontal synchronization signal detector 21 to detect the horizontal synchronization signal from an image signal of a video processor 11.

An error detector 22 which provides a signal after comparing the detected output of the horizontal synchronization signal detector 21 with the output of the reference horizontal synchronization signal generator 23.

The MICOM 7, which receives the control signal from the above comparing device 400, controls with the reference frequency signal generator 6 in the motor speed controlling means 200 and the switching part 20 in the motor driving device 100.

This spindle motor controlling apparatus operates in two modes, that is, the normal mode and an alternative mode when the frequency sensor 3 is defective.

In the normal mode of the frequency sensor 3, the MICOM 7 provides a low logic signal to the switching part 20, keeping the switch connected to the terminal a. Thus, the power supply 12 provides a driving force to the spindle motor 1.

The frequency sensor 3 provides a frequency signal in proportion to the rotating speed of the spindle motor to the time-base controller 5, and the reference frequency signal generator 6 provides the reference frequency signal to the time-base controller 5 at the same time. The time-base controller 5 compares the two frequency signals to each other, and provides the compared result to the spindle servo 8. Thus, the spindle servo 8 controls the speed of the spindle motor 1 according to the output of the time-base controller 5.

The light pickup 9 reads the data from the disk 2 and provides it to the preamplifier 10. The read data is amplified and is provided to the video processor 11, which provides the data read by the light pickup 9 as the image signal.

The horizontal synchronization signal of the image signal is detected by the horizontal synchronization signal detector 21 and it is compared with the reference horizontal synchronization signal at the error detector 22. The compared signal is applied to the MICOM 7. In this case, the detected horizontal synchronization signal is smaller than the reference horizontal synchronization signal since the spindle motor 1 is operating normally, so that the error detector 22 provides the low level signal to the MICOM 7.

The MICOM 7 provides a low level signal to the switching device 20, thereby connecting the switch to terminal a. Thus, when the frequency sensor 3 is normal, the power supply 12 provides electric power to the spindle motor 1, thereby driving the motor.

By contrast, if the frequency sensor 3 is defective, the speed of the spindle motor 1 increases continuously, so that the detected horizontal synchronization signal from the image signal of the video signal processor 11 becomes larger than the reference horizontal synchronization signal. Then, a error detector 22 provides the high level signal to the MICOM 7 and the MICOM provides a high level signal to the switching device 20, thereby connecting the switch to terminal b. Consequently, the power supply 12 cannot provide electric power to the spindle motor so the spindle motor 1 is stopped.

As mentioned above, the present invention can prevent an overrun of the spindle motor 1 by stopping the spindle motor 1 when the frequency sensor 3 is defective, that is, the power supply 12 is cut off by the switching device 20 when the horizontal synchronization signal detected from the disk 2 is larger than the reference horizontal synchronization signal.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A spindle motor controlling apparatus having means for driving a spindle motor, means for controlling rotating speed of said spindle motor, processing means for applying a first control signal to said motor speed controlling means, image processing means for providing an image signal by picking up a data signal of a disk mounted on said spindle motor, horizontal synchronization comparing means for detecting a horizontal synchronization signal from said image processing means and for providing a compared signal by comparing the detected synchronization signal with a reference synchronization signal and for applying the compared signal to said processing means, comprising:

said processing means providing a second control signal based on said compared signal; and switching means for controlling the supply of power to said spindle motor according to the second control signal of said processing means, whereby the spindle motor can be protected from the overrun.

2. A spindle motor controlling apparatus according to claim 1, wherein the horizontal synchronization comparing means comprises:

horizontal synchronization signal detecting means for detecting the horizontal synchronization signal of the image signal in the image processing means;

reference synchronization signal generating means for providing said reference synchronization signal and synchronization signal based upon the reference synchronization signal.

* * * * *

UNITED STATES PATENT AND TRADEMARK OFFICE
CERTIFICATE OF CORRECTION

PATENT NO. : U.S. 5,051,674
DATED : Sept. 24, 1991
INVENTOR(S) : Young-H an KIM It is certified that error appears in the above-identified patent and that said Letters Patent is hereby corrected as shown below:

Column 1, Line 15, change "means" to --device--, and change "for driving" to --which drives--;

Line 17, change "a" to --the--;

Line 18, change "a" to --the--;

Line 19, change "axis" to --axle--, and insert --1-- after "motor";

Line 21, change "White" to --There are white--, and change "are formed in" to --on the--;

Line 22, delete "said", and change "motor axis" to --motor's axle--;

Line 23, change "means" to --device--;

Line 26, change "A" to --The--, and change "means" to --device--, and change "a" to --the--;

Line 27, change "said" to --the--, and change "1, in which a" to --1. A--;

UNITED STATES PATENT AND TRADEMARK OFFICE
CERTIFICATE OF CORRECTION

PATENT NO. : U.S. 5,051,674
DATED : 24 September 1991
INVENTOR(S) : Young-Han KIM It is certified that error appears in the above-identified patent and that said Letters Patent is hereby corrected as shown below:

Column 1, Line 28, change "detecting a" to --which detects the--, and delete "according";

Line 29, delete "to a rotation", and change "motor axis" to --motor's axle--;

Line 30, change "synchronization" to --signal--, and change "changing" to --which changes--;

Line 32, insert --from-- after "signal";

Line 33, change "providing" to --which provides--;

Line 61, change "an" to --the--;

Line 62, change "the" (first occurrence) to --an--;

Line 68, change "a" (first occurrence) to --the--;

Column 2, Line 2, delete "1";

Line 3, delete "more and more";

Line 10, delete "according";

Line 13, change "device" to --devices--;

Line 19, delete "from";

UNITED STATES PATENT AND TRADEMARK OFFICE
CERTIFICATE OF CORRECTION

PATENT NO. : U.S. 5,051,674
DATED : 24 September 1991
INVENTOR(S) : Young - Han KIM It is certified that error appears in the above-identified patent and that said Letters Patent is hereby corrected as shown below:

Column 2, Line 20, change "said" to --the--;

Line 21, change "means" to --device--;

Line 22, change "of" to --from--;

Line 23, change "said" to --the--;

Line 25, change "said" to --the--;

Line 28, change "said" to --the-- (both occurrences);

Line 32, change "a" to --the--, and change "said" to --the--;

Line 43, change "a" (second occurrence) to --an--;

Line 64, change "of" to --from--;

UNITED STATES PATENT AND TRADEMARK OFFICE
CERTIFICATE OF CORRECTION

PATENT NO. : 5,051,674
DATED : September 24, 1991
INVENTOR(S) : Young - Han Kim

It is certified that error appears in the above-identified patent and that said Letters Patent is hereby corrected as shown below:

Column 3, Line 4, change "with" to --both--;

Line 6, change "means" to --device--, and change "part" to --device--

Line 39, delete "that", and change "the" (second occurrence) to --a--;

Line 51, change "a" to --an--, and change "the" to --a--;

Column 4, Line 14, insert --the-- after "of";

IN THE CLAIMS

Claim 2, Column 4, Line 47, insert --and-- after "means;".

Signed and Sealed this

Ninth Day of February, 1993

Attest:

STEPHEN G. KUNIN

Attesting Officer

Acting Commissioner of Patents and Trademarks